United States Patent [19]
DiGianfilippo et al.

[11] 3,936,616
[45] Feb. 3, 1976

[54] "WILD" MOBILE DISABLE CIRCUIT

[75] Inventors: Dominic J. DiGianfilippo, Chicago; Douglas W. Nickerson, East Dundee, both of Ill.

[73] Assignee: Motorola, Inc., Chicago, Ill.

[22] Filed: Sept. 23, 1974

[21] Appl. No.: 508,370

[52] U.S. Cl. ............... 179/41 A; 325/37; 343/227
[51] Int. Cl.² ......................................... H04Q 7/04
[58] Field of Search ........ 179/41 A; 325/55, 64, 37; 343/225, 227, 228

[56] References Cited
UNITED STATES PATENTS

| | | | |
|---|---|---|---|
| 3,098,212 | 7/1963 | Creamer, Jr. | 343/228 |
| 3,339,141 | 8/1967 | Rothewbuhler et al. | 343/228 |
| 3,571,519 | 3/1971 | Tsimbidis | 179/41 A |
| 3,806,663 | 4/1974 | Peek et al. | 179/41 A |
| 3,831,175 | 8/1974 | Mazalas | 179/41 A |

*Primary Examiner*—William C. Cooper
*Assistant Examiner*—Gerald L. Brigance
*Attorney, Agent, or Firm*—Victor Myer; James W. Gillman

[57] ABSTRACT

A circuit for disabling, or shutting down, the transmitter of a mobile telephone unit when the unit is not connected to another party is disclosed. When such a "wild" mobile is sensed, a sequence of idle and seize audio tones are sent and transitions therebetween are counted. When a specific number of counts are counted a disable signal is developed. The counter is continually reset and does not count when the handset is on hook. When the handset is off hook and the mobile is talking to a party voice falsing of the counter is prevented by a timer circuit.

7 Claims, 3 Drawing Figures

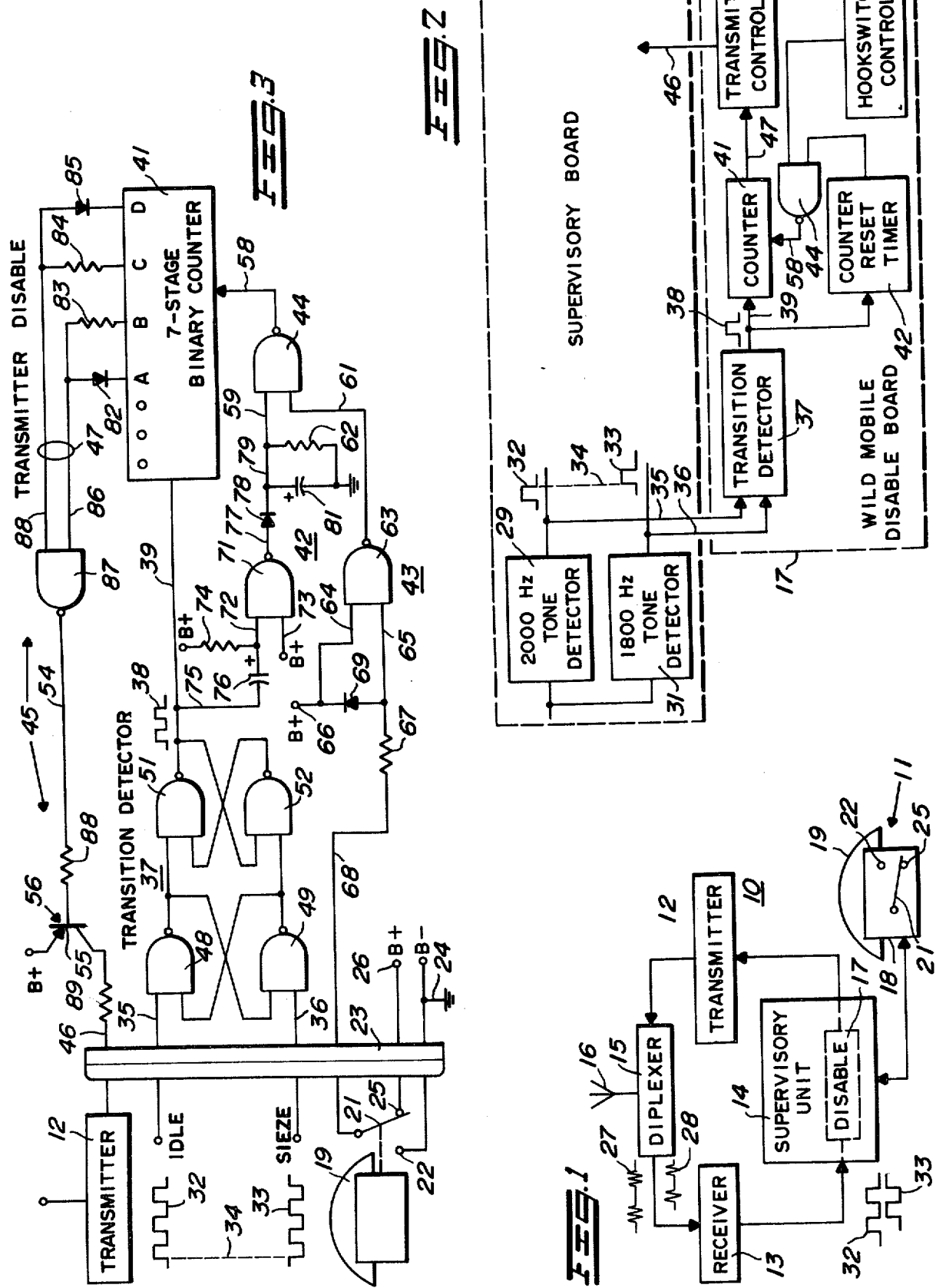

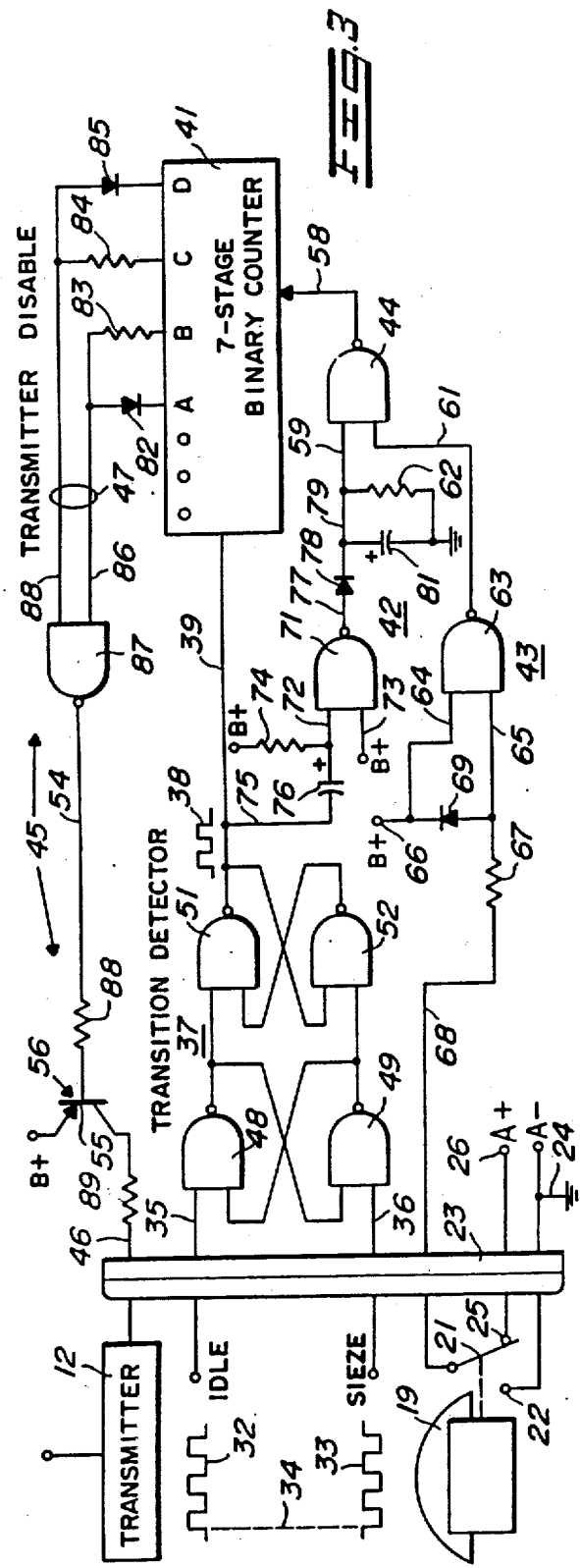

"WILD" MOBILE DISABLE CIRCUIT

BACKGROUND OF THE INVENTION

The field of the invention is automatic mobile telephone systems.

Automatic mobile telephone systems comprise a base stations and one or more mobile units each of which is provided with a radio receiver and a transmitter in addition to the necessary telephone equipment for ringing, connecting, disconnecting, etc.

In any one area of operation there are a limited number of channels available. Accordingly, it is essential that the channels be used effectively and efficiently in order that the maximum number of telephone conversations between parties can be carried on. For a mobile unit to have its receiver (handset) off hook when the unit is not actually talking to some other parties either mobile or otherwise, is essentially intolerable. Such a mobile unit is termed a wild mobile because its transmitter is sending the carrier frequency of that channel when the mobile unit is not actually talking to another party. That channel, or frequency, is being denied to some other mobile subscriber.

It is known in the art to shut off such wild mobile transmitters by having the base station sense, at intervals, when a mobile unit is wild and sending a disable, or shut off, signal. In the prior art, the disable signal has comprised an alternating sequence of 2,000 Hz and 1,800 Hz tones for a long period of time, for example, 30 seconds. The timing means sensed the length of time that the alternating tones, which may be the idle and seize tones, were received, and in response to the length of time, turned off or disabled the mobiles transmitter. Such a circuit while functioning reasonably well is subject to error because the timing circuit is subject to variations of its own. And in addition other tolerances in the apparatus make for a variable time, such for example, as temperature variations, voltage variations, humidity variations and aging characteristics of electronic components. The length of time necessary to be certain that the mobile is appropriately disabled ties up the channel for a needlessly long period of time.

Accordingly it is an object of the invention to provide a wild mobile disabling circuit which obviates the disadvantages of the prior art schemes.

It is a further object of the invention to provide an improved wild mobile disabling circuit of the nature indicated which shuts down the transmitter precisely, effectively and without being dependent upon the other variables in the system.

It is a further object of the invention to provide an improved wild mobile disabling circuit which utilizes faster signalling and may function to shut down the wild mobile in as short a period of time as the base station which sends the disable signal is able to send it. Thus there is no tieing up of a channel beyond what is necessary to shut down the wild mobiles transmitter.

According to the invention the improved wild mobile disabling circuit has no tolerance problems, is more reliable than known systems and has a faster shut down capability.

SUMMARY OF THE INVENTION

In carrying out the invention according to one form there is provided in a mobile telephone system including a mobile unit having a transmitter, a receiver and a handset having on hook and off hook positions and a base station for communication with the mobile receiver and transmitter, means for disabling the mobile transmitter when said transmitter is transmitting its carrier but is not connected to another party comprising: means for receiving a sequence of pulses of audio frequencies, means for counting the number of said pulses, means responsive to the count of a predetermined number of said pulses for shutting off said transmitter when said handset is non-functionally in its off hook position, means for inactivating said responsive means when said handset is in its on hook position, and means for preventing false operation of said responsive means by voice signals when said handset is in its functionally off hook position.

In carrying out the invention according to another form there is provided a receiver including a handset having on hook and off hook positions for a mobile telephone system including a mobile transmitter comprising: means for receiving a sequence of alternating pulses of two different audio frequencies, said pulses having a predetermined time duration, means for converting said pulses of audio frequencies into an alternating series of essentially squarewave pulses of said predetermined duration, means for converting concurrent or near concurrent transitions between high and low states of said squarewave pulses of both frequencies to count pulses, one for each such concurrent or near concurrent transition, means for counting the number of said count pulses, means responsive to the count of a predetermined number of said count pulses for shutting off said mobile transmitter when said handset is non-functionally in its off hook position, means for inactivating said responsive means when said handset is in its on hook position, and means for preventing false operation of said responsive means by voice signals when said handset is in its functionally off hook position.

BRIEF DESCRIPTION OF THE DRAWINGS

For a more complete understanding of the invention reference should be had to the drawings in which:

FIG. 1 is a block diagram illustrating an overall mobile telephone system in which the invention is used;

FIG. 2 is a block diagram of the components needed in a circuit according to the invention; and FIG. 3 is a circuit diagram of the invention.

DESCRIPTION OF THE PREFERRED EMBODIMENT

Referring to the drawings there is shown in FIG. 1 a mobile telephone system 10 as may be mounted in a vehicle, for example, an automobile, truck, or the like. The system 10 may comprise the usual telephone set 11, a transmitter 12, a receiver 13, a supervisory unit 14, a diplexer 15 and an antenna 16 all of which are interconnected as shown diagrammatically and as is well understood in the art.

The diplexer 15 serves to direct the signals from transmitter 12 to the antenna 16 when the unit is transmitting and serves to direct the incoming signals from antenna 16 to the receiver 15 when the unit is receiving. The receiver 13 amplifies, detects and otherwise treats the incoming signals as is well understood and transmits the detected signals to the supervisory unit 14 for further processing and directing to the appropriate components. Similarly the supervisory unit 14 processes the signals as may be generated from the handset 11 when the mobile unit is talking to another party, directs the signals to the transmitter from which the modulated signal is directed to the diplexer and antenna 16. Within the supervisory unit 14 there is shown in dotted lines the disable circuit 17 with which the subject invention is more particularly concerned.

The set 11 may comprise a base or cradle 18 and a handset 19 (microphone and speaker) arranged to operate a hook switch shown diagrammatically as a switch 21. In FIGS. 1 and 3 the handset 19, shown resting in the cradle 18 (on hook), actuates the switch arm 21 into contact with terminal 22 which, as may be seen in FIG. 3, is connected through the mobile plug 23 to ground 24. When the handset 19 is removed from the cradle, (off hook), the switch 21, commonly and conveniently referred to as the hook switch, engages the terminal 22 which is connected to a source of voltage 24 (A−). When the handset 19 is off hook, the transmitter 12 is energized as is well understood and sends its modulated signal to the antenna 16. Correspondingly when the handset is on hook the transmitter 12 should be deenergized and the channel made available to another subscriber. The wild mobile situation occurs when the handset 19 or similar device is not placed in the cradle, or is not placed there correctly, so that the hook switch 21 remains open (in talk or off hook condition.) That is to say the switch 21 remains connected to terminal 22 thereby permitting the transmitter to remain energized and transmitting its carrier frequency even though the subscriber is not connected to another party for talking purposes it may be termed that the handset is non-functionally in its off hook position. This is the situation which must be prevented and is prevented by the subject invention.

According to the invention when it is necessary to disable a wild mobile an alternating sequence of 2,000 Hz and 1,800 Hz tones or signal pulses of predetermined duration is sent from the base station. When a particular number of tone pulses have been sent, for example one hundred and twenty a shut off, or disable, signal is developed. These signal pulses are picked up by antenna 16 and through the diplexer are sent to the receiver 13, these tones being shown in FIG. 1 by the reference characters 27 and 28. After amplification in the receiver 13 the signals 27 and 28 are transmitted to the supervisory unit or board 14 for detection by the detectors 29 and 31. If desired, the detectors 29 and 31 might be part of the receiver rather than as part of the supervisory unit. In any event after detection by the detectors 29 and 31 respectively the 2,000 Hz signal becomes a series of squarewave pulses 32 and the 1,800 Hz signal becomes a series of squarewave pulses 33. The pulses 32 and 33 alternating with each other as may be seen by the dotted line 34. The 2,000 Hz tone is the usual idle tone signal and the 1,800 Hz tone is the usual seize tone signal of well known mobile telephone apparatus.

While pulses 32 and 33 are shown as being squarewaves, this is typical. Other shapes may be used. The term square is used to contemplate all such appropriate shapes. The 2,000 Hz squarewave pulses 32 and the 1,800 Hz squarewave pulses 33 are transmitted, respectively, over conductors 35 and 36 to the transition detector 37 of the wild mobile disable board or unit 17. The transition detector 37 develops squarewave pulses 38 which are transmitted over conductor 39 to counter 41, for example, a seven stage binary counter. The wild mobile disable board 17 includes a counter reset timer 42, a hook switch control component 43, NAND gate 44 and a transmit control circuit 45 from the latter of which the disable signal to the transmitter is sent over conductor 46 in the supervisory board.

The terms wild mobile disable board and supervisory board are used to define these units because in the construction thereof the various component units may be mounted on circuit boards.

The transition detector 37 develops a pulse 38 at each concurrent transition from squarewave pulse 32 to squarewave pulse 33 and vice versa. Transition concurrently at conductors 35 and 36 means that the signal on 35 goes high to low while at the same time, or nearly so, the signal on 36 goes from low to high, and vice versa. When a specific number of pulses 38, for example 120, each of which may be 25 milliseconds in length has been transmitted to counter and counted therein the counter develops a signal which is transmitted over conductor 47 to the transmit control circuit 45. The transmit control circuit 45 develops a signal which is transmitted over conductor 46 to turn off, or shut down, the transmitter 12. The number of counts necessary to produce this result is specific and does not depend upon any of the usual variable factors within the station's apparatus.

The hook switch control circuit 43 insures, as will be more fully described, that the counter 41 is continually reset, that is it never counts, when the hook switch is "closed" that is connected to A+ when the mobile unit is not in use. The counter reset timer 42 operates as will become clear to prevent false operation of the wild mobile disable circuit because of 2,000 Hz and 1,800 Hz components in the voice of the user.

Referring to FIG. 3 it will be seen that the NAND gates 48, 49, 51 and 52 interconnected as shown form the transition detector 37. Each of the NAND gates 48–52 functions according to the well known truth table as follows where X and Y are the logic states of the input signals to the gates and Z is the logic state of the resultant output signal:

| X | Y | Z |
|---|---|---|
| 1 | 1 | 0 |
| 0 | 1 | 1 |
| 1 | 0 | 1 |
| 0 | 0 | 1 |

With the NAND gates 48–52 functioning according to the truth table as shown, the truth table for the transition detector is as follows where the inputs 35 and 36 are the logic states of the idle and seize signals on conductors 35 and 36 and the output 38 is the logic state of the pulse 38. Only two conditions are shown for inputs 35 and 36 because the principle changes from high to low involved in the invention take place concurrently or nearly so:

| Input 35 | Input 36 | Input 38 |
|---|---|---|
| 0 | 1 | 0 |
| 1 | 0 | 1 |

Observing the squarewave pulses 32 and 33 it will be seen that when the idle tone squarewave is high, that is logical 1, the seize tone squarewave pulse 33 is low, that is logical 0, and vice versa at each transition from high to low for each of the tones as for example at dotted line 34.

When the predetermined number of counts 38 have been entered into the counter 41 such as for example as 120 counts, each of the last four outputs A, B, C and D of the seven stage binary counter goes high that is to a logical 1. Thus there are two logical 1s at the two inputs of the NAND gate 87 which delivers a low or logical 0 at its output on conductor 54. This when transmitted to the base 55 of transistor 56 turns this transistor on thereby putting a high on conductor 46 which shuts off the transmitter 12 thereby simulating putting the control head or handset on hook.

Conductor 58 supplies a reset signal to the binary counter 41 from the output terminal of NAND gate 44, the reset signal being a high or logical 1. This is developed by having lows or logical 0s on inputs 59 and 61 of NAND gate 44. The logical 0 on conductor 59 is developed through resistor 62, (100K Ohms) which is tied to ground as shown and the logical 0 on conductor 61 is developed at the output of NAND gate 63 by having highs or logical 1s at the two inputs 64 and 65 of NAND gate 63. The logical 1 on input 64 is developed by tieing this input to B+ voltage at terminal 66. Input 65 is connected through resistor 67 (47K Ohms) and conductor 68 to switch 21. When the handset 19 is "on hook" the switch 21 engages terminal 25 which in turn is connected to terminal 26 to which A+ voltage is applied. In this situation, the diode 69 prevents the input to NAND gate 63 on conductor 65 from rising than a forward diode voltage above B+ and thereby damaging NAND gate 63. Thus when the handset 19 is on hook the transmitter 12 should be disabled. A high or logical 1 on conductor 58 is a reset to counter 41 whereby this counter does not count when the handset 19 is on hook.

When the handset 19 is off hook, the switch 21 engages terminal 22 whereupon the ground at 24 gives a low or logical 0 on input 65 of gate 63. The low or logical 0 at input 65 of NAND gate 63 gives a high or logical 1 on output 61 and thus to this input of NAND gate 44. The input 61 being high and the input 59 being low the output 58 remains high and counter 41 remain reset or not counting. However under this condition with the handset 19 being off hook the idle and seize tones 32 and 33 coming over conductors 35 and 36 give rise to the pulses 38.

When the first of the pulses 38 becomes negative going as shown by the arrow, the signal on input 59 of NAND gate 44 becomes high or logical 1 whereupon the output of NAND gate 44 on conductor 58 becomes low or logical 0 as will be explained. Hence the binary counter 41 is now set for counting and it counts the number of pulses 38 coming to it over conductor 39, and when the number of these pulses reaches the indicated predetermined number, the last four outputs A, B, C and D of counter 41 all become high whereupon a low or logical 0 appears on conductor 54 which turns on the transistor 55 and turns off the transmitter 12 as has been explained.

The functioning of NAND gates 44 and 71 as a timing circuit to give the result indicated will now be described.

The NAND gate 71 has the same truth table as the other NAND gates referred to. The inputs of 72 and 73 are both connected to A+ voltage whereby these inputs are normally high or logical 1s. The input 72 is connected to B+ through a resistor 74 (100K Ohms.) The pulses 38 are supplied over conductor 75 to one terminal of capacitor 76 (3.3 microfarads), the other terminal of capacitor 76 being connected to the input conductor or terminal 72 as shown. Before the pulse 38 becomes negative going, the inputs 72 and 73 of NAND gate 71 are high (logical 1) and the output on conductor 77 is low (logical 0). The logical 0 on output conductor 77 remains a low and through diode 78 and conductor 79, the input on conductor 59 to NAND gate 44 remains low. Under this condition the output on conductor 58 of NAND gate 44 is high or logical 1 and the counter is reset or does not count. When the pulse 38 becomes negative going, however, the input on conductor 72 of NAND gate 71 is pulled down to a low or logical 0 whereupon the output 77 of NAND gate 71 becomes a high or logical 1. This charges the capacitor 81 (3.3 microfarads), and places a high or logical 1 on input 59 to NAND gate 44 whose output on conductor 58 now goes to a low or logical 0 thus setting the binary counter 41 to count the pulses 38 entering it over conductor 39.

When the pulses 38 are occurring at their regular rate and the handset remains off hook the condition just described will continue with the pulses 38 being entered into the binary counter 41. The time constants of the circuits comprising resistor 74 and capacitor 76 and resistor 62 and capacitor 81 are such that the voltage on input conductor 59 remains high so long as pulses 38 are occurring at their regular rate. In one practical example the time delay occasioned by the two circuits between the occurrence of a pulse going negative on conductor 75 and a change in the output state on conductor 58 was about 0.4 of a second. If pulses 38 occur at a lesser rate that is two pulses at an interval greater than 0.4 of a second, the binary counter 41 resets because the signal on conductor 58 becomes high or a logical 1. This occurs because the high at conductor 75 is coupled through to conductor 72 and capacitor 81 discharges through resistor 62; thereby enabling the input at 59 to go low. The diode 78 forces capacitor 81 to discharge through resistor 62. Capacitor 81 was charged when the output at 77 became high.

When the handset is off hook, as for example when the mobile phone set is in functional use, the counter 41 is set for counting, but there are no idle or seize tones 32 and 33 being transmitted nor received on input conductors 35 and 36. The transition detector thus detects no transitions and the signal state on conductor 39 is low or logical 0. No counts are being accumulated in counter 41. If however the voice of the person talking over the mobile phone connection generates a sequence of 2,000 Hz and 1,800 Hz tones which are the idle and seize tones a pulse 38 will be generated and will be entered into the counter 41. Unless a further transition is detected, that is a further sequence of 2,000 Hz and 1,800 Hz is generated by the voice talking within the 0.4 second interval of the timer 42, the signal on input 59 of gate 44 goes low or logical 0 and the counter 41 is reset as described. Thus the voice of a person talking over the mobile phone connection must generate a sequence of 2,000 Hz and 1,800 Hz tones whose interval between successive sequences of such tones is less than 0.4 of a second or the counts do not accumulate in the counter 41 and no voice falsing takes place. Voice falsing is prevented when the handset is functionally off hook.

The outputs A, B, C and D of counter 41 are connected respectively through diode 82 resistor 83 (100K Ohms) resistor 84 (100K Ohms) and diode 85 is well known. Diode 82 and resistor 83 are connected together to form one input 86 of NAND gate 87 and the resistor 84 and diode 85 are connected together to the other input 88 of NAND gate 87. The diodes 82 and 85 assure that all outputs of counter are high before there are two highs on conductors 86 and 88. The NAND gate 87 has the same truth table as already described and thus when the inputs 86 and 88 are high, as when the predetermined number for example 120 counts have accumulated in counter 41, the output of NAND gate 87 on conductor 54 becomes low or logical 0 and is transmitted through resistor 88 (22K Ohms) to the base 55 of transistor 56. When the base of transistor 56 (PNP type) is low the transistor conducts through resistor 89 thereby making conductor 57 high which shuts off the transmitter 12.

A base station (not shown) which transmits to a mobile, senses each mobile at intervals such as a half hour. If a mobile is transmitting but is not connected to a party, the disable signal is sent.

As will be evident the length of time of applying 2,000 Hz and 1,800 Hz alternating tones of the prior art to give a sufficiently long time interval to allow for time tolerances in the base station and mobile unit due to temperature variations voltage, humidity and aging characteristics, etc., of electronic components, etc., has been obviated. It is only necessary that a specific number of counts be entered into the counter 41 for it to effect turning off of the transmitter. The time that is necessary for the counter to reach the predetermined number of 120, for example, depends upon the base station. The faster that the signals are sent the sooner the transmitter will be shut down. Thus there is no tieing up of a channel beyond what is necessary to shut down the wild mobile's transmitter. The improvements of no tolerance problems, reliability and fast shut down capability are thereby readily achieved.

While specific values of parameters have been given, it will be clear that this is examplary. Other values within the scope of the invention may, of course, be ued.

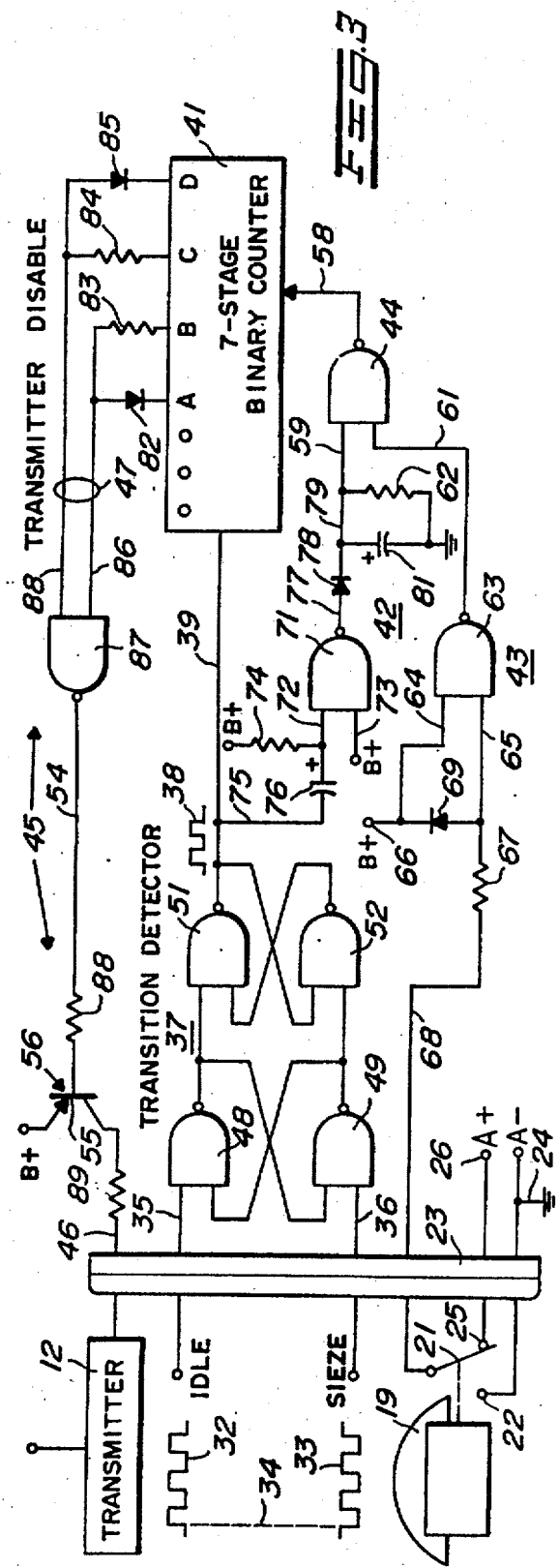

We claim:

1. In a mobile telephone system including a mobile unit having a transmitter, a receiver and a handset having on hook and off hook positions and a base station for communication with the mobile receiver and transmitter, means for disabling the mobile transmitter when said transmitter is transmitting its carrier but is not connected to another party comprising:
    means for receiving a sequence of pulses of audio frequencies,
    means for counting the number of said pulses,
    means responsive to the count of a predetermined number of said pulses for shutting off said transmitter when said handset is non-functionally in its off hook position,
    means for inactivating said responsive means when said handset is in its on hook position, and
    means for preventing false operation of said responsive means by voice signals when said handset is in its functionally off hook position.

2. In a mobile telephone system including a mobile unit having a transmitter, a receiver and a handset having on hook and off hook positions, the receiver comprising:
    means for receiving a sequence of pulses of audio frequencies,
    means for counting the number of said pulses, and
    means responsive to the count of a predetermined number of said pulses for shutting off said transmitter when said handset is non-functionally in its off hook position.

3. A receiver according to claim 2 including means for inactivating said responsive means when said handset is in its on hook position, and means for preventing false operation of said responsive means by voice signals when said handset is functionally in its off hook position.

4. In a mobile telephone system including a mobile unit having a transmitter, a receiver and a handset having on hook and off hook positions, the receiver comprising:
    means for receiving a sequence of alternating pulses of two different audio frequencies, said pulses having a predetermined time duration,
    means for converting said pulses of audio frequencies into an alternating series of essentially squarewave pulses of said predetermined duration,
    means for converting concurrent transitions between high and low states of said squarewave pulses of both frequencies to count pulses, one for each such concurrent transition,
    means for counting the number of said count pulses,
    means responsive to the count of a predetermined number of said count pulses for shutting off said mobile transmitter when said handset is non-functionally in its off hook position,
    means for inactivating said responsive means when said handset is in its on hook position, and
    means for preventing false operation of said responsive means by voice signals when said handset is in its functionally off hook position.

5. A receiver according to claim 4 wherein said means for inactivating said responsive means when said handset is in its on hook position comprises gate means supplying a continuous reset signal to said counting means.

6. A receiver according to claim 5 wherein said means for preventing false operation of said responsive means by voice signals comprises a timing circuit for providing a reset signal to said counting means whenever the time between said count pulses exceeds a predetermined time.

7. A receiver according to claim 6 wherein said predetermined time is about four tenths of a second.

* * * * *

UNITED STATES PATENT OFFICE
CERTIFICATE OF CORRECTION

Patent No. 3,936,616  Dated February 3, 1976

Inventor(s) Dominic J. DiGianfilippo et al.   Page 1 of 2

It is certified that error appears in the above-identified patent and that said Letters Patent are hereby corrected as shown below:

Figure 3, should appear as shown on the attached sheet.

Signed and Sealed this

Thirtieth Day of November 1976

[SEAL]

Attest:

RUTH C. MASON
*Attesting Officer*

C. MARSHALL DANN
*Commissioner of Patents and Trademarks*